US 12,319,588 B1

(12) United States Patent
Abdulkhair et al.

(10) Patent No.: US 12,319,588 B1
(45) Date of Patent: Jun. 3, 2025

(54) NANOCOMPOSITE MATERIAL FOR ENERGY STORAGE DEVICES

(71) Applicant: IMAM MOHAMMAD IBN SAUD ISLAMIC UNIVERSITY, Riyadh (SA)

(72) Inventors: Babiker yagoub Elhadi Abdulkhair, Riyadh (SA); Mohamed Khairy Abdel Fattah Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/968,864

(22) Filed: Dec. 4, 2024

(51) Int. Cl.
*C01G 39/00* (2006.01)

(52) U.S. Cl.
CPC ........ *C01G 39/006* (2013.01); *C01P 2004/64* (2013.01); *C01P 2006/40* (2013.01); *C01P 2006/80* (2013.01)

(58) Field of Classification Search
CPC ............... C01G 39/006; C01P 2004/64; C01P 2006/40; C01P 2006/80
See application file for complete search history.

(56) References Cited

U.S. PATENT DOCUMENTS

| | | |
|---|---|---|
| 2003/0020157 A1 | 1/2003 | Natori et al. |
| 2008/0174228 A1 | 7/2008 | Jung |
| 2024/0317599 A1 | 9/2024 | Jo et al. |

FOREIGN PATENT DOCUMENTS

| | | |
|---|---|---|
| CN | 116764613 A * | 9/2023 |
| KR | 10-0515029 B1 | 9/2005 |

OTHER PUBLICATIONS

Salih et al. (Fast-simplistic fabrication of MoO3@Al2O3—MgO triple nanocomposites for efficient elimination of pharmaceutical contaminants, Results in Chemistry, 2023) (Year: 2023).*

(Continued)

*Primary Examiner* — Sally A Merkling
*Assistant Examiner* — Logan Edward LaClair
(74) *Attorney, Agent, or Firm* — Oblon, McClelland, Maier & Neustadt, L.L.P.

(57) ABSTRACT

A method for synthesizing a $MoO_3@Al_2O_3$—MgO nanocomposite material includes adding distilled water and $HNO_3$ to a mixture of $(NH_4)_2MoO_4$, $Al(NO_3)_3 \cdot 9H_2O$, $Mg(Ac)_2 \cdot 4H_2O$, and sucrose to form a reaction mixture, heating the reaction mixture to a reaction temperature ranging from 150° C. to 220° C. until a carbonized product is formed, grinding of the carbonized product to form a ground carbonized product, and calcining the ground carbonized product at a temperature range from 700° C. to 800° C. for a period of 2 to 4 hours to form the $MoO_3@Al_2O_3$—MgO nanocomposite material. The $MoO_3$ content of the $MoO_3@Al_2O_3$—MgO nanocomposite material is in a range from 1 wt. % to 20 wt. %. The $MoO_3@Al_2O_3$—MgO nanocomposite material has an AC conductivity greater than or equal to $1 \times 10^{-6}$ S/m when measured at 6 megahertz.

18 Claims, 4 Drawing Sheets

(56) References Cited

OTHER PUBLICATIONS

Machine translation of CN116764613A (Year: 2023).*
Chun-Liang Yeh, et al., "Formation of Mo5Si3/Mo3Si—MgAl2O4 Composites via Self-Propagating High-Temperature Synthesis", Molecules, 25(1), Dec. 24, 2019, pp. 1-11.
Chun-Liang Yeh, et al., "Metallothermic Reduction of MoO3 on Combustion Synthesis of Molybdenum Silicides/MgAl2O4 Composites", Materials (Base), 14(17), Aug. 24, 2021, pp. 1-11.
Worachita Wongtawee, et al., "Amelioration of photocatalytic activity of MgAl2O4 spinel photocatalyst by coupling with WO3", Inorganic Chemistry Communications, vol. 152, Jun. 1, 2023, 4 Pages.

* cited by examiner

NANOCOMPOSITE MATERIAL FOR ENERGY STORAGE DEVICES

BACKGROUND

Technical Field

The present disclosure is directed toward nanocomposite materials and, more particularly, toward a method of synthesis of a $MoO_3@Al_2O_3$—MgO nanocomposite material.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Nanomaterials with enhanced electrical conductivity and dielectric properties are vital for modern electrical applications. Nanomaterials improve energy efficiency, charge storage, and durability in devices like supercapacitors and energy storage systems. The high surface area, tunable properties, and different electron transport capabilities of nanomaterials make them ideal for next-generation energy solutions and advanced electronic components.

The increased population has resulted in increased energy demand, which is responsible for energy crises and global warming issues. In recent times, energy has been primarily obtained from non-renewable sources like fossil fuels, which were costly and caused an increase in environmental pollution and depletion of energy reserves. Therefore, a search for alternative renewable energy sources that are sustainable and environmentally friendly, such as solar energy and wind energy, is ongoing. However, renewable energy sources depend upon weather conditions and therefore need to store energy. The energy storage problem may be overcome by prerequisite storage equipment such as supercapacitors (SC), fuel cells & Li-ion batteries. Among the aforementioned energy storage options, SCs are desirable since they can be used in different applications like energy and storage devices. Further, SC includes desirable properties such as low cost, eco-friendly, long cyclic life, high specific energy (E), high specific power, and enhanced capacitance. SC may include fast charging/discharging as compared to batteries since SC has reduced cycles, low power density, and low maintenance issues. SC is defined into two major categories: pseudo capacitors (PC) and electric double layer-capacitors (EDLC) [See: Imtiaz, M. et al., Fabrication of spinel $SrBi_2O_4$ nanomaterials anchored on $g$-$C_3N_4$ nanosheets with enhanced performance of electrode material for energy storage application, *Diamond and Related Materials*, 2023, 145, 111110]. The EDLC and PCs showed the hybrid nature of SC, which is newly developed and has combined properties of hybrid SC as fabricated like carbon-based material and transition metal oxides/chalcogenides. Hybrid SC shows both charge storage mechanisms like non-faradic and faradic processes. Transition metal oxide with various oxidation states with spinel structures is proven to be the best electrode material in catalysts, SC, and Li-ion batteries with high redox reaction analysis. In general, the spinel phase is a mixed oxide with a general formula of $AB_2O_4$. The spinel phase is an association between one divalent cation ($A^{2+}$), and two trivalent cations ($B^{3+}$). The spinel phase with the chemical formula $MgAl_2O_4$ is the mineral type of the aforementioned oxide family. $MgAl_2O_4$ has high thermal stability (melting point at 2135° C.), high hardness (16 GPa), high mechanical resistance, high resistance against chemical attack, wide band gap energy, high electrical resistivity, relatively low thermal expansion coefficient between 30° C. and 1400° C., low dielectric constant ($\varepsilon$=7.5), low density 3.58 g/cm$^3$, high thermal shock resistance, hydrophobicity, and low surface acidity, hence, $MgAl_2O_4$ has been widely used in various applications such as in metallurgical, electrochemical, radio technical and chemical industrial fields.

Research has focused on the preparation of the $MgAl_2O_4$ phase using different methods such as, conventional solid-state-reaction, sol-gel, spray drying (atomization), coprecipitation, microwave, hydroxide co-precipitation, hydrothermal, modified pechinic process, and organic gel-assisted citrate complexation. Further, some research has been focused on evaluating the electrical properties of $MgAl_2O_4$. The electrical properties of both thin film and bulk $MgAl_2O_4$ at 313 Kelvin (K) were analyzed in environments at different relative humidity values between 2% and 95%, using AC impedance spectroscopy in 0.1 Hz-10 KHz frequency range [See: Gusmano, G. et al., Microstructure and Electrical Properties of $MgAl_2O_4$ Thin Films for Humidity Sensing, *Journal of the American Ceramic Society*, 76, 743-750].

The doping process of the oxide may improve the electrical and physical properties, so the oxide was doped with vanadium. Although synthesis techniques may modify the characteristics to some extent, doping the parent lattice with appropriate cations is a commonly employed strategy for improving and changing the properties of the materials. However, there is still a requirement for efficient, effective, and sustainable methods for developing nanocomposite materials of the classes defined above to assist supercapacitors in energy storage.

Accordingly, one object of the present disclosure is to provide a method for the synthesis of nanocomposite materials that may circumvent the drawbacks, such as limited electrical conductivity, low thermal efficiency, and insufficient dielectric performance, of the materials known in the art.

SUMMARY

In an exemplary embodiment, a method for synthesizing a $MoO_3@Al_2O_3$—MgO nanocomposite material is described. The method includes adding distilled water and nitric acid ($HNO_3$) to a mixture of $(NH_4)_2MoO_4$, $Al(NO_3)_3 \cdot 9H_2O$, $Mg(Ac)_2 \cdot 4H_2O$, and sucrose to form a reaction mixture and heating the reaction mixture to a reaction temperature ranging from 150° C. to 220° C. until a carbonized product is formed. The method further includes grinding of the carbonized product to form a ground carbonized product and calcining the ground carbonized product at a temperature range from 700° C. to 800° C. for a period of 2 to 4 hours to form the $MoO_3@Al_2O_3$—MgO nanocomposite material. The $MoO_3$ content of the $MoO_3@Al_2O_3$—MgO nanocomposite material is in a range from 1 percent by weight (wt. %) to 20 wt. % of the total weight of the $MoO_3@Al_2O_3$—MgO nanocomposite material. The $MoO_3@Al_2O_3$—MgO nanocomposite material has an AC conductivity greater than or equal to $1\times10^{-6}$ siemens per meter (S/m) when measured at 6 megahertz (MHz).

In some embodiments, the $(NH_4)_2MoO_4$ is present in the reaction mixture in a concentration range from 0.1 molar (M) to 1.0 M.

In some embodiments, the $(NH_4)_2MoO_4$ is present in the reaction mixture in a concentration range from 0.2 M to 0.5 M.

In some embodiments, the sucrose is present in the reaction mixture in a concentration range from 0.1 M to 1 M.

In some embodiments, the sucrose is present in the reaction mixture in a concentration range from 0.45 M to 0.65 M.

In some embodiments, the $Al(NO_3)_3 \cdot 9H_2O$ is present in the reaction mixture in a concentration range from 0.5 M to 1.5 M.

In some embodiments, the Al $Al(NO_3)_3 \cdot 9H_2O$ is present in the reaction mixture in a concentration range from 0.9 M to 0.95 M.

In some embodiments, the $Mg(Ac)_2 \cdot 4H_2O$ is present in the reaction mixture in a concentration range from 2.0 M to 2.7 M.

In some embodiments, the $Mg(Ac)_2 \cdot 4H_2O$ is present in the reaction mixture in a concentration range from 2.2 M to 2.5 M.

In some embodiments, the $HNO_3$ is present in the reaction mixture in a concentration range from 1.8 to 3.0 M.

In some embodiments, the $MoO_3$ content of the $MoO_3@Al_2O_3$—MgO nanocomposite material ranges from 5 wt. % to 15 wt. % of the total weight of the $MoO_3@Al_2O_3$—MgO nanocomposite material.

In some embodiments, the $MoO_3$ content of the $MoO_3@Al_2O_3$—MgO nanocomposite material ranges from 9 wt. % to 11 wt. % of the total weight of the $MoO_3@Al_2O_3$—MgO nanocomposite material.

In some embodiments, the $MoO_3@Al_2O_3$—MgO nanocomposite material has an AC conductivity greater than or equal to $2 \times 10^{-6}$ S/m when measured at 6 MHz.

In some embodiments, the $MoO_3@Al_2O_3$—MgO nanocomposite material has an AC conductivity greater than or equal to $4 \times 10^{-6}$ S/m when measured at 6 MHz.

In some embodiments, the $MoO_3@Al_2O_3$—MgO nanocomposite material has a dielectric constant in a range of 7 to 11 when measured at 6 MHz.

In some embodiments, the $MoO_3@Al_2O_3$—MgO nanocomposite material has a dielectric constant in a range of 8 to 10 when measured at 6 MHz.

In some embodiments, the $MoO_3@Al_2O_3$—MgO nanocomposite material has a dielectric constant in a range of 8.5 to 9.5 when measured at 6 MHz.

In some embodiments, the $MoO_3@Al_2O_3$—MgO nanocomposite material has a dielectric loss factor of less than or equal to 1.5 when measured at 6 MHz.

In some embodiments, the $MoO_3@Al_2O_3$—MgO nanocomposite material has a dielectric loss factor of less than or equal to 1.0 when measured at 6 MHz.

In some embodiments, the $MoO_3@Al_2O_3$—MgO nanocomposite material has a dielectric loss factor of less than or equal to 0.5 when measured at 6 MHz.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
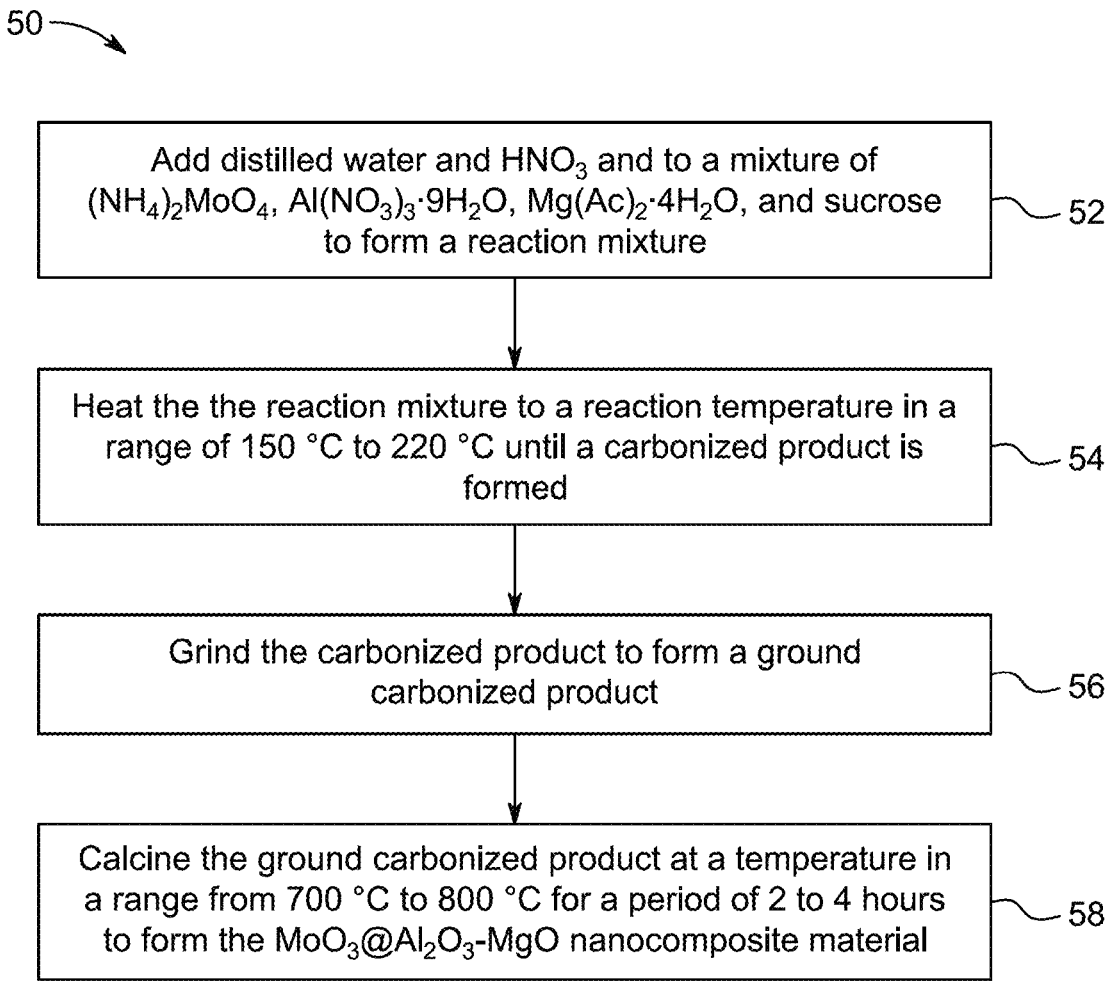
FIG. 1 is a schematic flow chart depicting a method of synthesizing a $MoO_3@Al_2O_3$—MgO nanocomposite material, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

As used herein, the term 'dielectric loss factor' refers to the energy dissipation per cycle in the material. Specifically, it quantifies the ratio of the energy lost as heat to the energy stored in the dielectric material during one cycle of the applied electric field. Higher tan δ indicates higher energy loss and lower efficiency in storing electrical energy.

As used herein, the term 'dielectric constant' refers to the measure of how much a material can store electrical energy in an electric field, relative to the amount of energy stored in a vacuum. It is a dimensionless quantity that indicates how easily a material can be polarized by an applied electric field.

Aspects of the present disclosure are directed to a method of fabricating a $MoO_3@Al_2O_3$—MgO nanocomposite material designed to improve the performance of semiconductor devices. The material is based on a unique composite structure, incorporates a combination of metal oxides and alumina, offering enhanced electrical conductivity and better frequency-dependent behavior. The composition and fabrication methods simplify the synthesis process while also leading to high efficiency and stability. The nanomaterial demonstrates improvements in electrical properties, such as an increase in AC conductivity and a more stable dielectric response over a range of frequencies. The present disclosure provides a solution for applications requiring high-frequency performance and greater material stability. In contrast to prior art, which often relies on complex synthesis routes and results in materials with lower conductivity at higher frequencies, the disclosed material circumvents these drawbacks by providing enhanced electrical performance, particularly in terms of frequency response and material stability, making it an ideal candidate for next-generation semiconductor technologies.

FIG. 1 illustrates a flow chart of a method 50 for synthesizing a $MoO_3@Al_2O_3$—MgO nanocomposite material. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes adding distilled water and $HNO_3$ to a mixture of $(NH_4)_2MoO_4$, Al $Al(NO_3)_3 \cdot 9H_2O$, $Mg(Ac)_2 \colon 4H_2O$, and sucrose to form a reaction mixture. The Al $Al(NO_3)_3 \cdot 9H_2O$ provides the $Al^{3+}$ ions needed to form $Al_2O_3$; the $Mg(Ac)_2 \cdot 4H_2O$ supplies the $Mg^{2+}$ ions, $(NH_4)_2MoO_4$ provides the molybdenum oxide precursorThe sucrose acts as a carbon source to potentially aid in creating a porous structure. In some embodiments, glucose, citric acid, glycerol, tannic acid, polyvinyl alcohol (PVA), humic acid may also be used in place of sucrose to serve as the carbon source.

Nitric acid is generally used to facilitate the dissolution of the mixture in water and helps in forming the reaction mixture; although other acids like hydrochloric acid (HCl), sulfuric acid ($H_2SO_4$), perchloric acid ($HClO_4$), boric acid ($H_3BO_3$), phosphoric acid, hydrofluoric acid, hydrobromic acid, hydroiodic acid, perchloric acid, chloric acid, bromic acid, iodic acid, selenic acid, telluric acid, carbonic acid, silicic acid, boric acid, chromic acid, manganic acid, periodic acid, arsenic acid, antimonic acid, stannic acid, phosphorous acid, hypophosphorous acid, hypochlorous acid, chlorous acid, hypobromous acid, bromous acid, hypoiodous acid, iodous acid, perbromic acid, periodic acid, carbonic acid can be used as well.

In some embodiments, the sucrose is present in the reaction mixture in a range from 0.1 to 1 M, more preferably 0.45 to 0.65 M, and yet more preferably about 0.584 M. In some embodiments, the concentration of $(NH_4)_2MoO_4$ in the reaction mixture in a range from 0.1 to 1.0 M, preferably about 0.2 to 0.5 M. In some embodiments, the concentration of $Al(NO_3)_3 \cdot 9H_2O$ present in the reaction mixture is in a range from 0.5 to 1.5 M, more preferably 0.9 to 0.95 M, and yet more preferably 0.930 M. In some embodiments, the concentration of $Mg(Ac)_2 \colon 4H_2O$ in the reaction mixture is in the range from 2.0 to 2.7 M, more preferably 2.2 to 2.5 M, and yet more preferably 2.36 M. The $HNO_3$ is present in the reaction mixture in a range from 1.8 to 3.0 M.

At step 54, the method 50 includes heating the reaction mixture to a reaction temperature in a range of 150 to 220° C. until a carbonized product is formed. In some embodiments, heating of the reaction mixture can be performed by using heating appliances such as ovens, microwaves, autoclaves, hot plates, heating mantles and tapes, oil baths, salt baths, sand baths, air baths, hot-tube furnaces, and hot-air guns. The heating is carried out until all the water is evaporated and the carbon source has degraded.

At step 56, the method 50 includes grinding the carbonized product to form a ground carbonized product. The grinding may be carried out using any suitable means, for example, ball milling, blending, etc., using manual method (e.g., mortar) or machine-assisted methods such as using a mechanical blender, or any other apparatus known to those of ordinary skill in the art. In a preferred embodiment, the carbonized product is ground in a mortar to obtain the ground carbonized product.

At step 58, the method 50 includes calcining the ground carbonized product at a temperature in a range from 700 to 800° C., more preferably 720 to 820° C., and yet more preferably 750° C. for a period of 2 to 4 hours, 2.5 to 3.5 hours, and yet more preferably 3 hours to form the $MoO_3@Al_2O_3$—MgO nanocomposite material. The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50° C./min, preferably up to 40° C./min, preferably up to 30° C./min, preferably up to 20° C./min, preferably up to 10° C./min, preferably up to 5° C./min. During calcination, any carbon source material left further decomposes, leaving behind a porous structure, and the metal salts convert to oxides, forming the $MoO_3@Al_2O_3$—MgO nanocomposite material. The properties of the $MoO_3@Al_2O_3$—MgO nanocomposite material produced are the same as those described above. The product of calcination may retain a carbonaceous residue obtained from the carbonization of the sucrose and the subsequent calcination of the carbonized product. As the calcination of the present disclosure will conventionally occur in the absence of activators or templating agents for the carbonized product, it is considered that the retained carbonaceous residue will comprise amorphous carbon. In certain embodiments, the nanocomposite may comprise amorphous carbon in an amount up to about 2 wt. %, based on the weight of the nanocomposite. For example, the nanocomposite may comprise amorphous carbon in an amount up to about 1 wt. % or up to about 0.5 wt. %, based on the weight of the nanocomposite.

The $MoO_3$ content of the $MoO_3@Al_2O_3$—MgO nanocomposite material is in a range from 1 to 20 wt. %, preferably in a range from 5 to 15 wt. %, preferably in a range from 9 to 11 wt. %, more preferably 10 wt. % of the total weight of the $MoO_3@Al_2O_3$—MgO nanocomposite material.

In some embodiments, the $MoO_3@Al_2O_3$—MgO nanocomposite material has an AC conductivity greater than or equal to $1 \times 10^{-6}$ S/m, preferably greater than or equal to $2 \times 10^{-6}$ S/m, preferably greater than or equal to $3 \times 10^{-6}$ S/m, preferably greater than or equal to $4 \times 10^{-6}$ S/m, when measured at 6 MHz. In some embodiments, the $MoO_3@Al_2O_3$—MgO nanocomposite material has a dielectric constant in a range of 7 to 11, preferably 8 to 10, preferably 8.5 to 9.5, preferably around 9 when measured at 6 MHz. In some embodiments, the $MoO_3@Al_2O_3$—MgO nanocomposite material has a dielectric loss factor of less than or equal to 1.5, preferably less than or equal to 1.0, preferably less than or equal to 0.5 when measured at 6 MHz.

EXAMPLES

The following examples demonstrate a method for synthesizing a $MoO_3@Al_2O_3$—MgO nanocomposite material. The examples are provided solely for illustration and are not to be construed as limitations of the present disclosure, as many variations thereof are possible without departing from the spirit and scope of the present disclosure.

Example 1: Preparation of 10% $MoO_3@$ $Al_2O_3$—MgO Nanohybrids

According to the present disclosure, about 10.0 grams (g) of sucrose, 17.46 g of Al $Al(NO_3)_3 \cdot 9H_2O$, 25.41 g of $Mg(Ac)_2 \cdot 4H_2O$ and the appropriate amount of ammonium molybdate were transferred to a beaker of 500 milliliters (mL). In the powder mixture, 50 mL of distilled water (DW) and 5 mL of nitric acid ($HNO_3$) were added and heated to a temperature of 100° C. until the mixture turned into a clear solution. Further, the temperature was raised to about 150° C. to 200° C. and heated until the sucrose was carbonized. The resulting black product was ground in a mortar, calcined at 700° C. for 3.0 hours, and the 10% $MoO_3@Al_2O_3$—MgO triple nanocomposite was then collected.

Example 2: Electrical Measurements

A two-probe method was used to measure the electrical conductivity (EC) of tablets that are 10 millimeters (mm) in diameter and about 1 mm in thickness. The tablets were made by pressing powder under a pressure of $2 \times 10^{-3}$ $kg/cm^2$. Further, silver paste was spread on both surfaces of the tablet, and the tablets were placed in an oven to remove any moisture. Under room temperature conditions, the electrical conductivity, dielectric constant, dielectric loss, and impedance were measured by a programmable automatic LCR bridge (model HIOKI IM 3536) at a fixed voltage of 1.0 volt (V) and frequencies between 1000 hertz (Hz) and 2 megahertz (MHz). The frequency-dependent complex dielectric function may be expressed by equation (1):

$$\varepsilon^{**}(\omega) = \varepsilon'(\omega) - j\varepsilon''(\omega) \tag{1}$$

with $j = \sqrt{-1}$, the imaginary part of the permittivity was represented by '$\varepsilon'''$', while the real part was represented by '$\varepsilon'$'. Equation (2) and equation (3) were used to approximate the values for $\varepsilon'$ and $\varepsilon''$:

$$\varepsilon' = Cd/\varepsilon^\circ As \tag{2}$$

$$\varepsilon''(\omega) = \varepsilon'(\omega) \tan \delta \tag{3}$$

where, '$\varepsilon^\circ$' ($\varepsilon^\circ = 8.86 \times 10^{-12}$ F/m) represents the free space permittivity, 'd' represents thickness, 'As' represents cross-section area, '$\tan \delta$' represents dissipative factor and '$\omega$' ($2\pi f$) represents electric field frequency.

Figure 2:
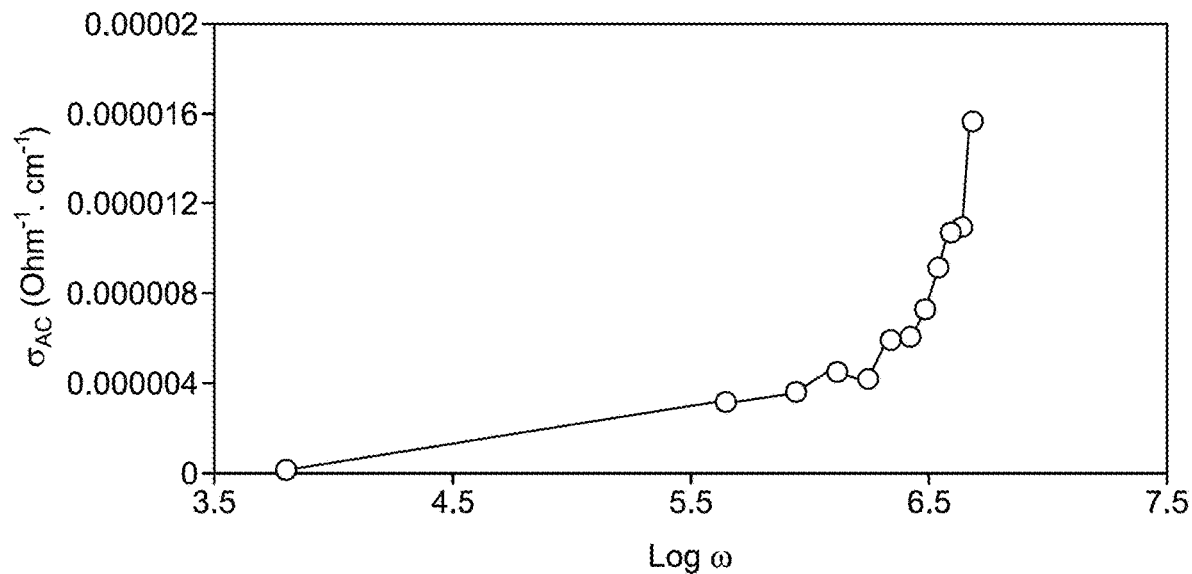
FIG. 2 is a graph depicting the frequency influences on the alternating current (AC) conductivity of $MoO_3/MgAl_2O_4$ nanocomposite, according to certain embodiments.

The AC method distinguishes between a plurality of mechanisms, such as electrode response, grain boundary conduction, and grain conduction. In addition, grain conduction contributes to the overall conductivity of a material. The frequency dependence of AC conductivity for the $MoO_3/MgAl_2O_4$ nanocomposite was analyzed at room temperature, as shown in FIG. 2. Equation (4) was utilized to determine the AC conductivity of each sample:

$$\sigma_{AC} = \varepsilon' \varepsilon^\circ \omega \tan \delta \tag{4}$$

where '$\varepsilon^\circ$' represents vacuum permittivity, '$\varepsilon'$' represents the dielectric constant, and '$\tan \delta$' represents the loss tangent.

FIG. 2 illustrates that AC conductivity increases with frequency, particularly at higher frequencies, due to the greater pumping power delivered to charge carriers by the high frequency. Hence, AC conductivity is highest at higher frequencies [See: Su, F., et al., mpg-C(3)N(4)-Catalyzed selective oxidation of alcohols using O(2) and visible light, *J. Am. Chem. Soc.*, 2010 Nov. 24; 132 (46): 16299-301]. An increase in the hopping rate of charge between the charge carriers was sufficient to enhance conductivity without increasing the number of charge carriers.

The Koops model predicts the behavior of the nanocomposite as a multilayer capacitor of grains and grain boundaries [See: Yan, S. et al., Photodegradation Performance of g-C3N4 Fabricated by Directly Heating Melamine, *Langmuir*, 2009, 25, 17, 10397-10401]. The Koops model may explain the increase in AC conductivity with temperature and frequency. A practically continuous plateau region was observed at lower frequencies, attributed to the resistive grain boundaries, which hindered the hopping of electronic charge carriers between boundaries. However, the conductive grains were more active at higher frequencies, allowing charge carriers to hop between neighboring ions.

The release of trapped charge carriers from localized regions resulted in increased high-frequency conductivity, a stronger applied field, and higher migration and movement of the released charge carriers in multiple directions. The conduction behavior of material was influenced by liberated charge carriers and electron mobility among many metal ions [See: Maheshwaran, G. et al., Fabrication of self charging supercapacitor based on two dimensional bismuth-ene-graphitic carbon nitride nanocomposite powered by dye sensitized solar cells, *Journal of Energy Storage, Volume* 56, Part A, 2022, 105900].

Materials used in semiconductors have the following frequency-dependent relationship, as depicted by equation (5):

$$\sigma_{AC}(\omega) = A\omega^s \tag{5}$$

where 'A' and 's' are constants.

Figure 3:
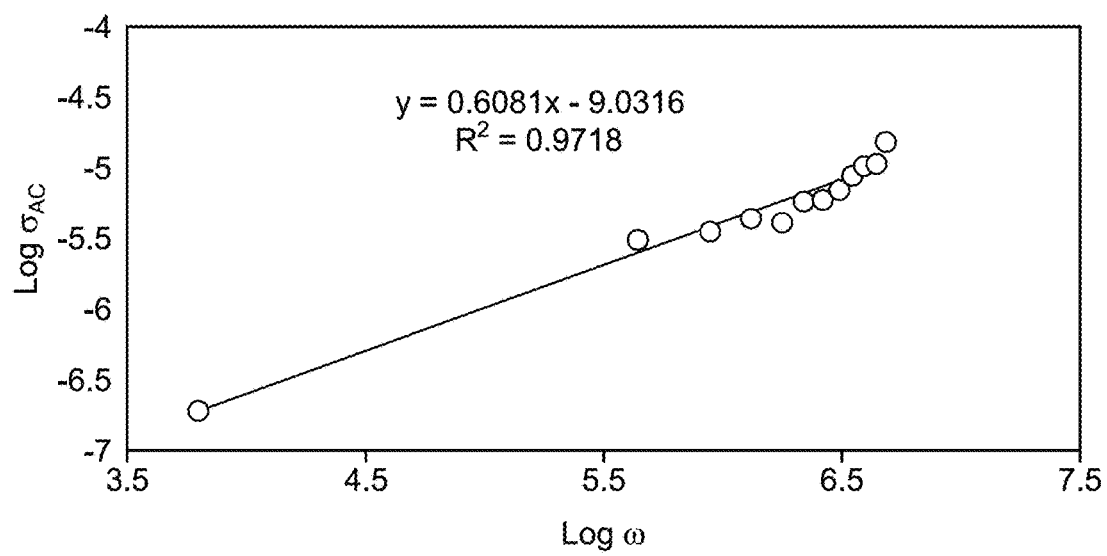
FIG. 3 is a graph depicting dependency of $MoO_3/MgAl_2O_4$ nanocomposite on AC conductivity frequency, according to certain embodiments.

A sudden hopping of the charge carriers results in translational motion if $s<1$, while a localized hopping of the species was indicated by $s>1$ [See: Rao, B. et al., Effect of sintering conditions on resistivity and dielectric properties of Ni—Zn ferrites, *Journal of Materials Science*, 1997, 32, 6049-6054]. The effect was caused by the relaxation resulting from the movement of electrons or atoms by tunneling or hopping between equilibrium locations. The exponent 's' was determined by graphing the natural logarithm of $\sigma_{AC}(\omega)$ against the natural logarithm of ($\omega$), as shown in FIG. 3.

The value of 's' was 0.6081, which indicated that correlated barrier hopping (CBH) was the most likely mechanism in the $MoO_3/MgAl_2O_4$ nanocomposite. In general, the relation between the conduction mechanism and 's(f)' behavior may suggest a suitable model for the conduction mechanism.

Figure 4:
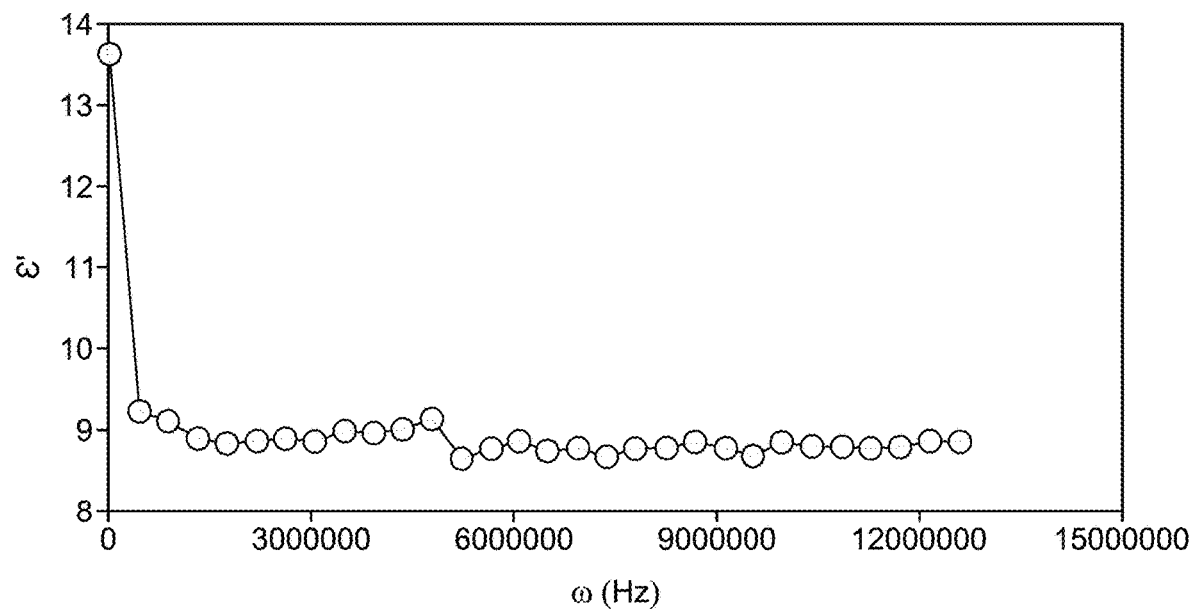
FIG. 4 is a graph depicting frequency dependence of dielectric constant of $MoO_3/MgAl_2O_4$ nanocomposite, according to certain embodiments.

The frequency dependence of the '$\varepsilon'$' for the $MoO_3/MgAl_2O_4$ nanocomposite at room temperature is illustrated in FIG. 4, which shows a dispersion in '$\varepsilon'$' values as the frequency increased. At lower frequencies, the decline in '$\varepsilon'$' values occurs very quickly, whereas at higher frequencies, approaching a constant value takes a longer time.

Further, charge polarization may generally be referred to as the storage of some energy in a substance when exposed to an external electric field. The stored energy was represented by the real component '$\varepsilon'$' of the dielectric constant. To evaluate the behavior of microstructural entities such as grains and grain borders, it was vital to examine the dielectric constant. Hence, FIG. 4 illustrates the effect of frequency on the '$\varepsilon'$' of the examined materials at specific temperatures. The graph indicated that for the nanocomposite, '$\varepsilon'$' decreased with an increase in frequency. The decline in '$\varepsilon'$' was rapid at lower frequencies but more gradual at higher frequencies. The observed dielectric behavior may be explained by the hopping process and the idea of polarization [See: Sivakumar, D. et al., Structural Characterization and Dielectric Studies of Superparamagnetic Iron Oxide Nanoparticles, *Journal of the Korean Ceramic Society*, 55, 3]. The composite was presumed to include distinct regions (grains and grain boundaries), with the conductivity of the grains being higher than that of the grain boundaries. As a result, higher '$\varepsilon'$' values were linked to charge accumulation at the grain boundaries. According to Koops' theory, the interfacial polarization of the Maxwell-Wagner type was used to interpret the dielectric dispersion curves. These models suggested that the composite was made up of conductor-rich grains separated by conductor-poor grain boundaries, with the grain boundaries being more effective at low frequencies and the grains becoming more effective at higher frequencies.

Figure 5:
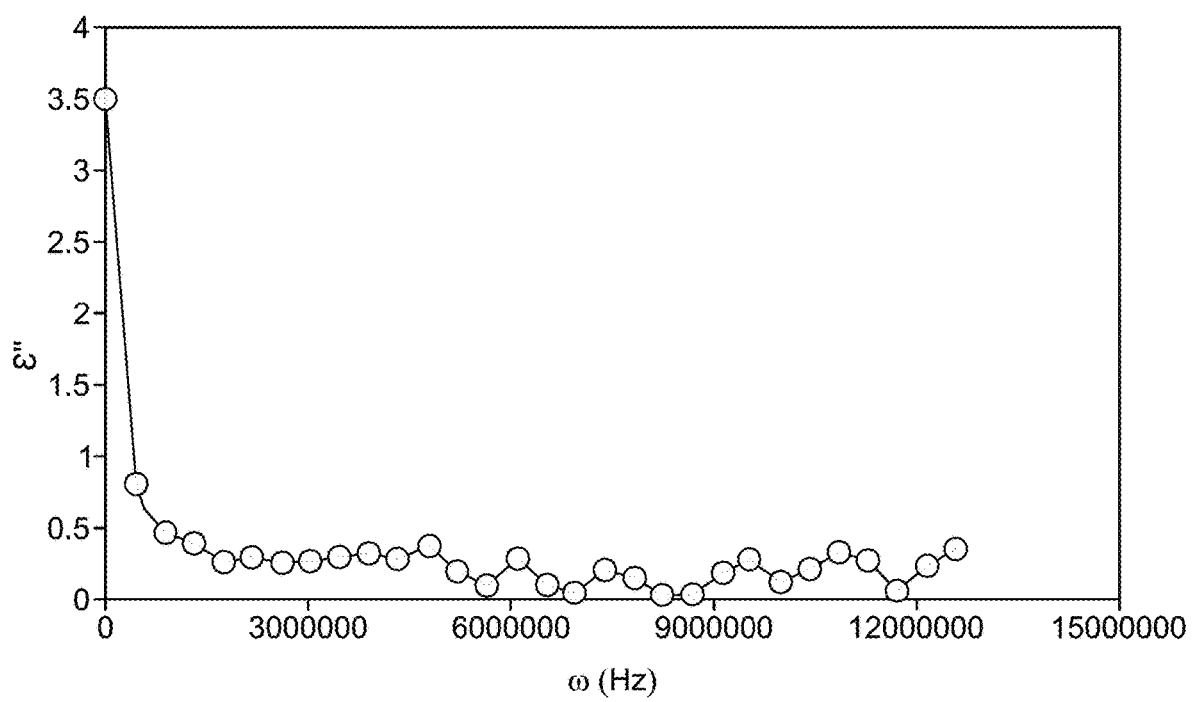
FIG. 5 is a graph depicting frequency-dielectric loss ($\varepsilon''$) correlation for $MoO_3/MgAl_2O_4$ nanocomposite, according to certain embodiments.

In general, dielectric loss specifies the amount of energy dissipated due to the movement of charge carriers. FIG. 5 shows the variation of 'ε'" with frequency for the $MoO_3$/$MgAl_2O_4$ nanocomposite at room temperature. The behavior obtained is comparable to that of the real part of the dielectric constant, which decreases as frequency increases. In the low-frequency range, the 'ε" value dropped sharply, while it remained low in the high-frequency range. The aforementioned trend may be explained by the fact that the samples exhibited higher resistivity at low frequencies due to the grain boundaries, requiring more energy for charge hopping between cations, which resulted in higher losses. At higher frequencies, where the samples exhibited lower resistivity due to the grains, less energy was required for charge hopping between cations at the octahedral sites. The polarization of space charges may have contributed to the reduction in dielectric loss as frequency increased.

Figure 6:
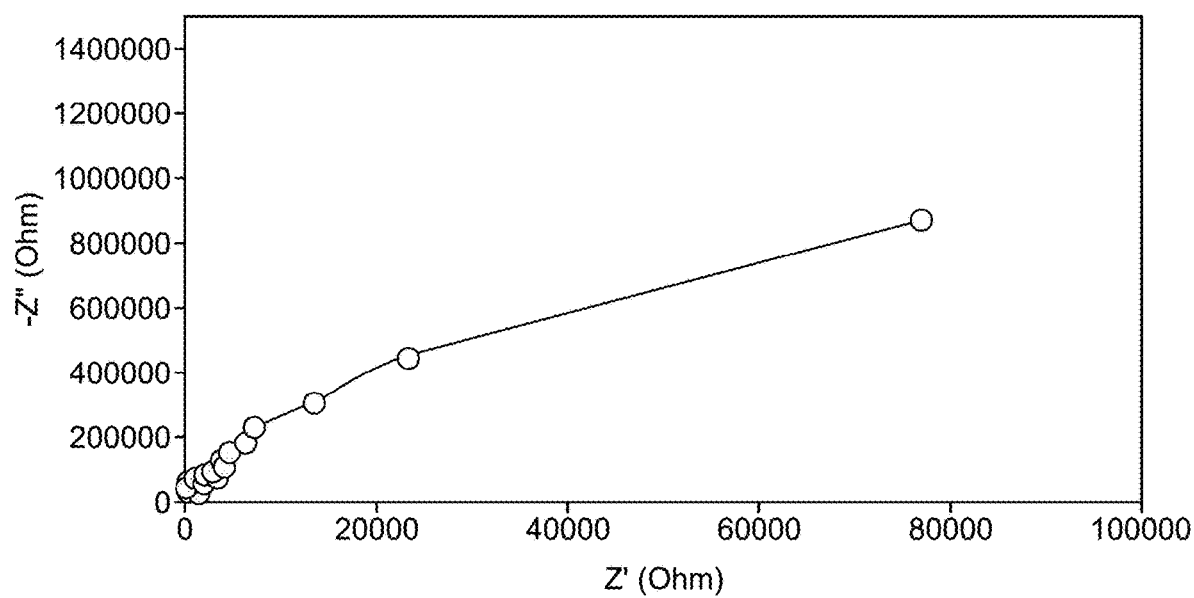
FIG. 6 is a graph depicting Nyquist (Z"-Z') plots for $MoO_3/MgAl_2O_4$ nanocomposite at room temperature, according to certain embodiments.

Further, impedance spectroscopy may be an efficient technique for correlating the electrical properties with the microstructure of substrates. In general, electrochemical impedance spectroscopy (EIS) spectra depicts distinct semicircles in the complex impedance plane, reflecting different relaxation times. The impedance responses from the grain boundaries and the grains may overlap if the variation in time constants among the processes is less than 100. FIG. 6 shows the complex impedance spectra for the $MoO_3$/$MgAl_2O_4$ nanocomposite, depicting a single depressed semicircle in the complex impedance plots at 303 K [See: Ahmed, M. et al., Rare earth doping effect on the structural and electrical properties of Mg—Ti ferrite, *Materials Letters*, Volume 57, Issues 26-27, 2003].

The aspects of the present disclosure provide the method for synthesizing a $MoO_3@Al_2O_3$—MgO nanocomposite material. In particular, 10 wt. % $M003@MgAl_2O_4$ nanomaterials were synthesized using the method described herein. The electrical conductivity values for the nanomaterials increased with increasing frequency, indicating their semiconducting behavior. The variation of dielectric constant (ε'), dielectric loss (ε"), and AC conductivity for the examined nanomaterials at different frequencies was evaluated. Both dielectric constant (ε') and dielectric loss (ε") were decreased with the increase of frequency, while the AC conductivity increased. The hopping of electrons and holes is suggested to be the electrical conduction mechanism. Hence, the 10 wt. % $MoO_3$/$MgAl_2O_4$ nanomaterials developed in accordance with the present disclosure, depicted desirable characteristics, rendering them fit for use in supercapacitors, energy storage applications, and electrical applications.

Numerous modifications and variations of the present disclosure are possible in light of the above teachings. It is therefore to be understood that within the scope of the appended claims, the invention may be practiced otherwise than as specifically described herein.

The invention claimed is:
1. A method for synthesizing a $MoO_3@Al_2O_3$—MgO nanocomposite material, comprising:
   adding distilled water and $HNO_3$ to a mixture of $(NH_4)_2MoO_4$, $Al(NO_3)_3 \cdot 9H_2O$, $Mg(Ac)_2 \cdot 4H_2O$, and sucrose to form a reaction mixture;
   heating the reaction mixture to a reaction temperature in a range of 150° C. to 220° C. until a carbonized product is formed;
   grinding the carbonized product to form a ground carbonized product; and
   calcining the ground carbonized product at a temperature in a range from 700° C. to 800° C. for a period of 2 to 4 hours to form the $MoO_3@Al_2O_3$—MgO nanocomposite material,
   grinding the $MoO_3@Al_2O_3$—MgO nanocomposite material to form a nanocomposite powder,
   pressing the nanocomposite powder under a pressure of from $1\times10^{-3}$ to $1\times10^{-2}$ kg/cm$^2$ to form a nanocomposite tablet having a diameter of about 10 mm and a thickness of about 1 mm, and
   spreading a silver paste on both sides of the tablet;
   wherein the $MoO_3$ content of the $MoO_3@Al_2O_3$—MgO nanocomposite material is in a range from 9 wt. % to 11 wt. % based on the total weight of the $MoO_3@Al_2O_3$—MgO nanocomposite material, and
   wherein the $MoO_3@Al_2O_3$—MgO nanocomposite material has an AC conductivity greater than or equal to $1\times10^{-6}$ S/m when measured at 6 MHz.

2. The method of claim 1, wherein the $(NH_4)_2MoO_4$ is present in the reaction mixture in a range from 0.1 M to 1.0 M.

3. The method of claim 2, wherein the $(NH_4)_2MoO_4$ is present in the reaction mixture in a range from 0.2 M to 0.5 M.

4. The method of claim 1, wherein the sucrose is present in the reaction mixture in a range from 0.1 M to 1 M.

5. The method of claim 4, wherein the sucrose is present in the reaction mixture in a range from 0.45 M to 0.65 M.

6. The method of claim 1, wherein the Al $Al(NO_3)_3 \cdot 9H_2O$ is present in the reaction mixture in a range from 0.5 M to 1.5 M.

7. The method of claim 6, wherein the Al $Al(NO_3)_3 \cdot 9H_2O$ is present in the reaction mixture in a range from 0.9 M to 0.95 M.

8. The method of claim 1, wherein the $Mg(Ac)_2 \cdot 4H_2O$ is present in the reaction mixture in a range from 2.0 M to 2.7 M.

9. The method of claim 8, wherein the $Mg(Ac)_2: 4H_2O$ is present in the reaction mixture in a range from 2.2 M to 2.5 M.

10. The method of claim 1, wherein the $HNO_3$ is present in the reaction mixture in a range from 1.8 M to 3.0 M.

11. The method of claim 1, wherein the $MoO_3@Al_2O_3$—MgO nanocomposite material has an AC conductivity greater than or equal to $2\times10^{-6}$ S/m when measured at 6 MHz.

12. The method of claim 11, wherein the $MoO_3@Al_2O_3$—MgO nanocomposite material has an AC conductivity greater than or equal to $4\times10^{-6}$ S/m when measured at 6 MHz.

13. The method of claim 1, wherein the $MoO_3@Al_2O_3$—MgO nanocomposite material has a dielectric constant in a range of 7 to 11 when measured at 6 MHz.

14. The method of claim 13, wherein the $MoO_3@Al_2O_3$—MgO nanocomposite material has a dielectric constant in a range of 8 to 10 when measured at 6 MHz.

15. The method of claim 14, wherein the $MoO_3@Al_2O_3$—MgO nanocomposite material has a dielectric constant in a range of 8.5 to 9.5 when measured at 6 MHz.

16. The method of claim 1, wherein the $MoO_3@Al_2O_3$—MgO nanocomposite material has a dielectric loss factor of less than or equal to 1.5 when measured at 6 MHz.

17. The method of claim 16, wherein the $MoO_3@Al_2O_3$—MgO nanocomposite material has a dielectric loss factor of less than or equal to 1.0 when measured at 6 MHz.

18. The method of claim 17, wherein the $MoO_3@Al_2O_3$—MgO nanocomposite material has a dielectric loss factor of less than or equal to 0.5 when measured at 6 MHz.

* * * * *